Figure 1:
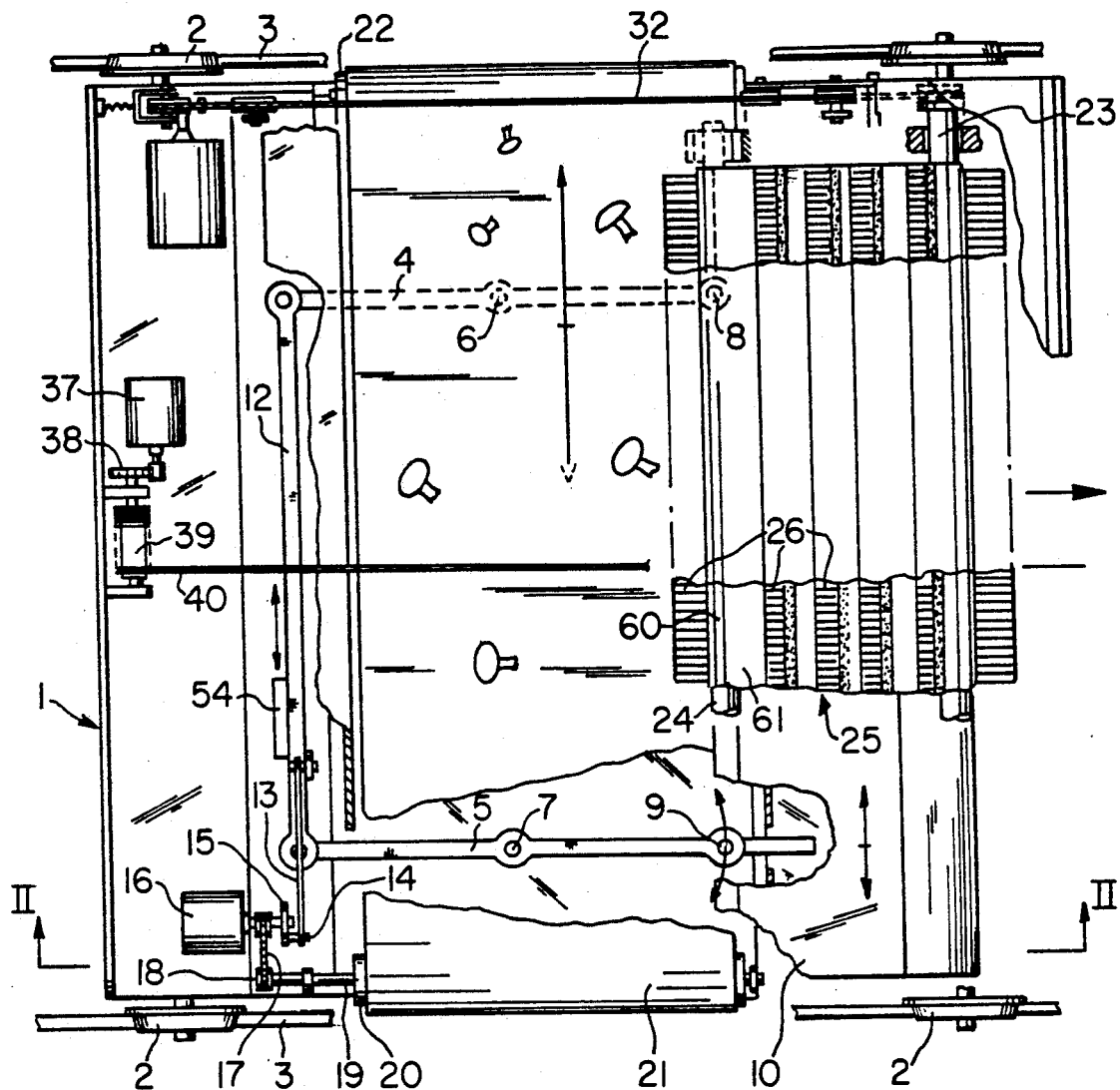

United States Patent [19]

van den Top

[11] Patent Number: 5,035,109
[45] Date of Patent: Jul. 30, 1991

[54] APPARATUS FOR HARVESTING MUSHROOMS

[76] Inventor: Hendrik van den Top, Bellstraat 19, 3771 AH Barneveld, Netherlands

[21] Appl. No.: 591,718

[22] Filed: Oct. 2, 1990

[30] Foreign Application Priority Data

Oct. 5, 1989 [NL] Netherlands ............... 8902483

[51] Int. Cl.$^5$ ............................................. A01D 45/00
[52] U.S. Cl. .................................... 56/327.1; 56/16.4; 56/16.6
[58] Field of Search ................. 56/327.1, 16.4, 155, 56/158, 167, 16.6

[56] References Cited

U.S. PATENT DOCUMENTS

| | | | |
|---|---|---|---|
| 3,624,990 | 12/1971 | Sinden et al. | 56/327.1 |
| 3,635,005 | 1/1972 | Persson | 56/327.1 |
| 4,344,275 | 8/1982 | Kateman | 56/327.1 |
| 4,472,929 | 9/1984 | MacCanna et al. | 56/327.1 |

FOREIGN PATENT DOCUMENTS

| | | |
|---|---|---|
| 3435371 | 4/1973 | Australia . |
| 0100207 | 2/1984 | European Pat. Off. . |
| 7107587 | 12/1971 | Netherlands . |
| 8501733 | 1/1987 | Netherlands . |
| 534473 | 3/1973 | Switzerland . |
| 2011773 | 7/1979 | United Kingdom . |

Primary Examiner—Bruce M. Kisliuk
Attorney, Agent, or Firm—Webb, Burden, Ziesenheim and Webb

[57] ABSTRACT

An apparatus for harvesting mushrooms comprises a mobile frame 1 that can move along guidings 3 and a knife 10 with a cutting edge 11. The mushrooms cut off by the knife 10 move upward along a sloping surface and are transported by the conveyor 25 which has carriers in the form of brush bristles 26. The carriers 26 have a mutual spacing which corresponds approximately with the width of the buttom of the mushroom so that a cut mushroom is gripped between successive carriers and is transported standing upright. Owing to this individual transport damage is prevented.

3 Claims, 1 Drawing Sheet

U.S. Patent

July 30, 1991

5,035,109

APPARATUS FOR HARVESTING MUSHROOMS

The invention relates to an apparatus for harvesting mushrooms cultivated on a bed, wherein a knife having a virtually horizontally oriented cutting edge and coupled to a drive device is located in a mobile frame and extends transversely of the direction of travel for performing a reciprocating movement, which knife connects with a rising portion onto a conveyor disposed behind the knife and wherein a lifting device provided with carriers is mounted above the knife. Such an apparatus is known from the Netherlands patent application 7811358.

In this known apparatus the mushrooms are collected on the knife after cutting and carried with the carrier device up to the conveyor. After collecting on the knife and during transport over the knife the mushrooms assume random positions. In view of the fact that the centre of gravity of the mushroom is quite high they will be moved over the knife lying tipped on their sides. The mushrooms come into mutual contact therein and damage can occur while the mushrooms are being carried along by the carrier device. Owing to the stricter quality standards required of mushrooms, harvested but damaged mushrooms have a lower market value.

The invention has for its object to obviate this drawback.

This is achieved according to the invention in that the carriers are placed at a mutual interval of approximately the width of the button of a mushroom.

As a result of the invention a mushroom, after cutting, is carried along by successive brushes with the button in vertical position. A mushroom is thus moved individually over the knife and damage resulting from mutual contact or from the carriers striking against the mushrooms does not occur.

The lifting device preferably consists of parallel rolls placed at a mutual interval, an endless belt trained around the rolls, ridges of flexible material placed at regular mutual intervals transversely on the belt and brushes inserted on the ridges.

Thus ensured is a good guiding of the belt over the rolls, while a sufficient gripping zone for the inserted brushes is nevertheless obtained.

The carrier device preferably runs roughly horizontally and extends to the cutting edge of the knife, and the length of the brushes is chosen such that the mushrooms for harvesting are grasped by successive brushes during cutting.

Thus ensured is that the mushroom is already gripped in operationally reliable manner during cutting and that it moves over the knife in standing position.

The invention is further elucidated with reference to the drawings.

Figure 2:
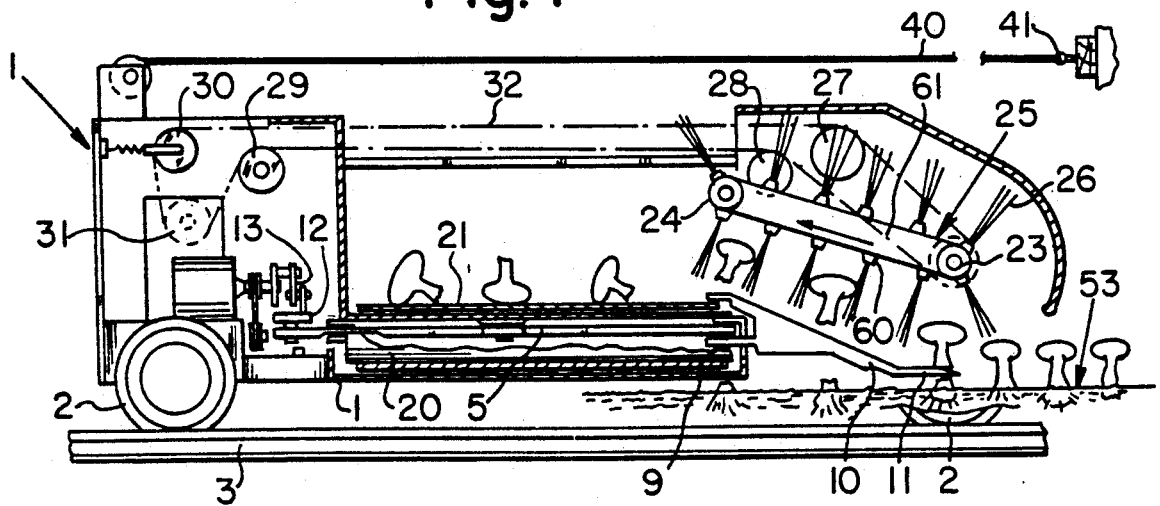

In the drawings:

FIG. 1 shows according to the invention in top view, a portion is broken away, and FIG. 2 shows the apparatus of FIG. 1 in a section along the line II—II in FIG. 1.

The apparatus according to the invention consists of a frame 1 provided with wheels 2 which can roll over guidings 3. Two arms 4 and 5 are mounted for swivelling about the respective vertical shafts 6 and 7. At the one end the arms 4 and 5 are pivotally connected at respectively 8 and 9 to a knife 10 provided with a horizontally oriented cutting edge 11. At the other end the arms 4 and 5 are pivotally connected to a rod 12. Engaging onto the rod 12 is a drive rod 13 which is in turn connected to the crank 14 of a crank mechanism 15 that is driven by a motor 16. Via a belt 17 and a pulley 18 the motor 16 drives a shaft 19 with a drive roll 20 around which is trained an endless conveyor belt 21 which is guided at the other end around a roll 22 mounted for free rotation in the frame 1. The knife 10 connects with the rear edge onto the conveying surface of the conveyor belt 21.

Further mounted in the frame are two rolls 23 and 24 around which is trained an endless belt 25 which is provided with carriers in the form of brush bristles of Chinese pig bristle 26. The roll 23 is driven via pulleys 27, 28, 29, 30 and 31, wherein the pulley 31 is driven by a motor. Trained around the pulleys is a rope 32. The pulley 30 is embodied as tension pulley. The rolls 24 and 33 can be adjusted in transverse direction so that the place of the first gripping of the carriers 26 can be set. Because of the tension pulley 30 the belt 32 then remains continually tensioned.

On the frame is further placed a winch drum 39 driven by a motor 37 and gear wheels 38. Around the winch drum can be wound a cable 40 which, as FIG. 2 shows, can be fastened at 41 to a fixed point. By causing the winch drum 39 to rotate, the apparatus pulls itself forward along the guidings 3.

The frame 1 can move along the guidings 3 over a culture bed 53 on which mushrooms grow. The cable 40 is fastened at the end of the bed so that when the cable 40 is wound up using the winch drum 39 the apparatus moves forward along the bed. Using the motor 16, the rod 12 is moved reciprocally via the crank drive rod mechanism 13, 14, 15, whereby the arms 4 and 5 perform a reciprocal swinging movement on the shafts 6 and 7. The ends 8 and 9 of the arms 4 and 5 perform a reciprocating movement transversely of the travel direction and a reciprocating movement in the travel direction. The knife 10 connected pivotally to the arms 4 and 5 at 8 and 9 performs a corresponding movement. As the frame 1 moves forward along the guidings 3 the cutting edge 11 encounters the mushrooms standing on the bed 53. As a result of the two reciprocating movements the mushrooms are cut off wherein they tend to topple over backwards onto the cutting edge il. In the embodiment according to FIGS. 1 and 2 mushrooms are then gripped by the carriers 26 attached to the driven belt 25 and the mushrooms are transported to the belt 21, which carries them off in sideways direction. A conveyor belt (not drawn) can extend along the bed 53. The mushrooms falling off the conveyor belt 21 are then caught by the conveyor belt extending along the bed 53 which can carry them to a collection point.

Due to the fact that the successive brushes 26 according to the invention are placed at a mutual interval corresponding approximately with the width of the button of a mushroom, a mushroom is grasped by successive brushes 26 at the button as soon as it is cut off and carried along in vertical direction to the conveyor 21. As FIG. 2 shows, the carrier device consists of a flexible endless belt whereon ridges of flexible material 60 are arranged in transverse direction to enable insertion of the brush bristles therein. Because a space 61 is kept free between the ridges 60 the conveyor belt can follow the path round the rolls unobstructed.

I claim:

1. Apparatus for harvesting mushrooms cultivated on a bed, wherein a knife having a virtually horizontally oriented cutting edge and coupled to a drive device is located in a mobile frame and extends transversely of the direction of travel for performing a reciprocating movement, which knife connects with a rising portion onto a conveyor disposed behind the knife and wherein a lifting device provided with carriers is mounted above the knife, characterized in that the carriers are placed at a mutual interval of approximately the width of the button of a mushroom.

2. Apparatus as claimed in claim 1, characterized in that the lifting device consists of parallel rolls placed at a mutual interval, an endless belt trained around the rolls, ridges of flexible material placed at regular mutual intervals transversely on the belt and brushes inserted on the ridges.

3. Apparatus as claimed in claim 1 or 2, characterized in that the carrier device runs roughly horizontally, extends up to the cutting edge of the knife and that the length of the brushes is chosen such that the mushrooms for harvesting are grasped by successive brushes during cutting.

* * * * *

UNITED STATES PATENT AND TRADEMARK OFFICE
CERTIFICATE OF CORRECTION

PATENT NO. : 5,035,109

DATED : July 30, 1991

INVENTOR(S) : Hendrik van den Top

It is certified that error appears in the above-identified patent and that said Letters Patent is hereby corrected as shown below:

Abstract Line 8 "buttom" should read --button--.

Column 1 Line 57 after "shows" insert --an apparatus--.

Column 1 Line 57 after "view," insert --wherein--.

Column 2 Line 44 "il" should read --11--.

Signed and Sealed this

Twenty-second Day of December, 1992

*Attest:*

DOUGLAS B. COMER

*Attesting Officer*   Acting Commissioner of Patents and Trademarks